United States Patent Office.

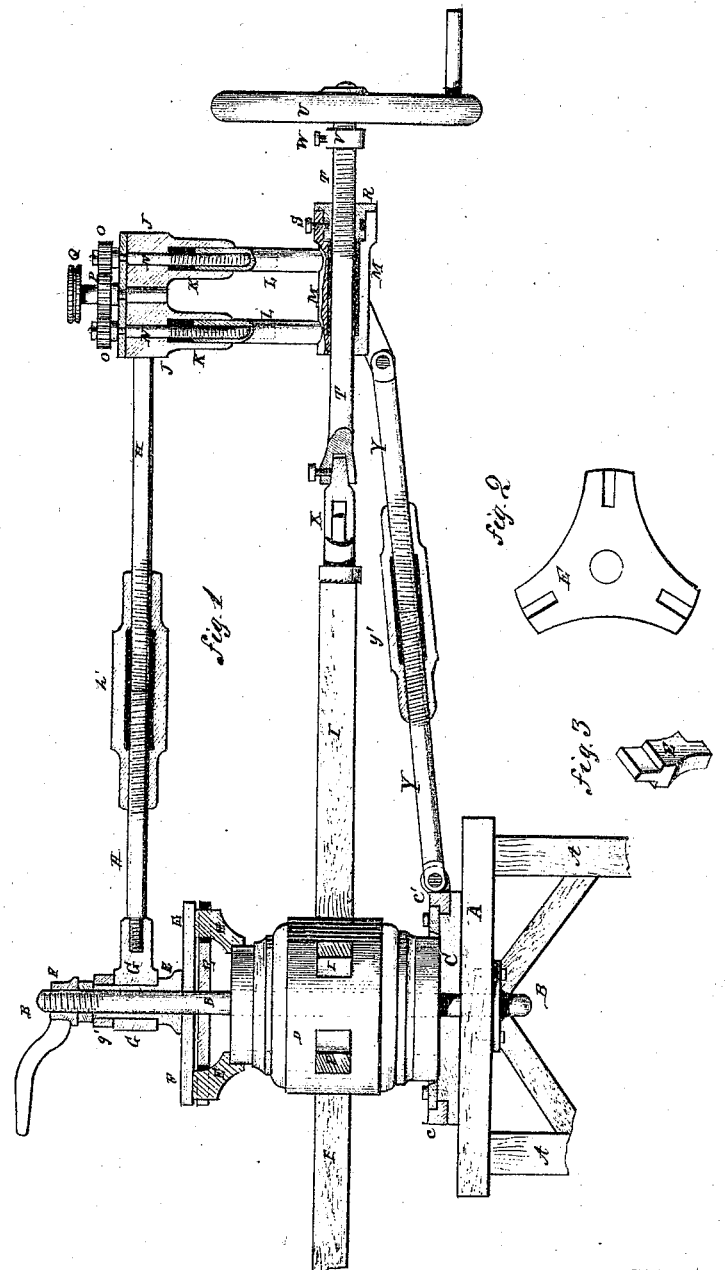

JAMES P. CRUTCHFIELD AND C. T. WHITTEN, OF LONGMIRE'S STORE, SOUTH CAROLINA.

Letters Patent No. 98,746, dated January 11, 1870.

IMPROVEMENT IN MACHINE FOR TENONING SPOKES.

The Schedule referred to in these Letters Patent and making part of the same.

*To all whom it may concern:*

Be it known that we, JAMES P. CRUTCHFIELD and C. T. WHITTEN, of Longmire's Store, in the district of Edgefield, and State of South Carolina, have invented an Improved Spoke-Tenoning Machine; and we do hereby declare that the following is a full, clear, and exact description thereof, which will enable those skilled in the art to make and use the same, reference being had to the accompanying drawings, forming part of this specification.

Figure 1 is a side view of our improved spoke-tenoning machine, partly in section, to show the construction.

Figures 2 and 3 are detail views of parts of the centring-chuck.

Our invention has for its object to furnish a simple and convenient machine, by means of which the spokes of wheels may have the tenons formed upon their outer ends easily and accurately; and It consists in the construction and combination of various parts of the machine, as hereinafter more fully described.

A represents the bench or table ordinarily used by wheelwrights.

B is an iron rod, secured to the floor or bottom of the bench or table, in the centre, and which passes up through the bottom plate C, through the hub D, and through the centring-chuck E.

The rod B has a screw-thread cut upon its upper end, to receive the nut F.

The bottom plate C, which rests upon the bench or table A, and upon which the hub D rests, is made with a movable rim, c', having lugs formed upon one of its sides, as shown in fig. 1.

E is the centring-chuck, or machine used with Dole's patent hub-auger, upon the stock of which is placed a movable collar, G, which is kept in place by the nut g', screwing upon a screw-thread cut upon the upper end of the said stock.

The movable collar G is made with a stem, having a screw-socket formed in it, to receive the end of the bar H, which carries the brace-frame.

The bar H is made in two parts, having a right and left screw-thread cut upon their adjacent ends, to receive the right and left nut h', so that by turning the nut h' in one or the other direction, the bar H may be extended or contracted to adjust it to the length of the spokes I, to be operated upon.

J is the brace-frame, which is attached to the outer end of the bar H, and into the hollow arms K of which enter, and nicely fit, the hollow arms L of the brace-guide M.

The hollow arms L have a screw-thread cut in their inner surfaces, into which fit the threads formed upon the screws N, which are swiveled to the brace-frame J, and to the upper ends of which are attached the small gear-wheels O, the teeth of both of which mesh into the teeth of the central gear-wheel P, to which is attached the small hand-wheel Q.

By this construction, the screws N will both be turned at the same time, and through exactly the same space, to raise and lower the brace-guide M squarely, to adjust its position according to the length of the hub D, and the consequent position of the spokes I.

The brace-guide M is made with a countersink in its outer end, to receive the movable nut R, which is made with a circular flange around its outer end, to fit against the outer end of the brace-guide M, and which is kept in place by the set-screw S, which passes in through the side of the brace-guide M, and enters a circular groove in the nut R, so that the said nut may be held stationary or allowed to revolve, as may be desired.

T is the brace-stock, which passes through and revolves in the brace-guide M, has a very fine screw-thread cut upon its outer part, fitting into the screw-thread of the nut R, and has a crank-wheel, U, attached to its outer end.

V is a collar placed upon the outer part of the brace-stock T, and secured in place, when adjusted according to the required length of the spoke-tenons, by the set-screw W.

By this construction, when the tenon has been cut to the required length, the adjustable collar V strikes against the flanged nut R, and prevents the further advance of the stock T.

The set-screw S is then loosened, allowing it to be carried around by and with the collar V, allowing the brace-stock T to revolve without advancing, thus squaring the shoulder of the spoke-tenon evenly.

X is the hollow auger, which is detachably attached to the socket of the brace-stock T, so that it may be removed and replaced by a pointing-tool, to point the spokes to enter the said hollow auger.

Y is the stay-bar, one end of which is bolted to lugs formed upon the brace-guide M, and its other end is bolted to lugs formed upon the movable rim c' of the bottom plate C, as shown in fig. 1.

The stay-bar Y is made in two parts, having a right and left screw-thread cut upon their adjacent ends, to receive the right and left nut y', so that the length of the bar Y may be adjusted to correspond with the length of the bar H, hereinbefore described.

Having thus described our invention,

What we claim as new, and desire to secure by Letters Patent, is—

1. The combination of the brace-frame J, hollow arms K, hollow arms L, brace-guide M, swivelled screws N, gear-wheels O P, and hand-wheels Q, with each other and with the adjustable extension-bars H Y, substantially as herein shown and described, for the purpose of adjusting the position of the brace-guide M according to the length of the hub.

2. The combination of the bottom plate C c', extension stay-bar Y y', movable collar and nut G g', and extension-bar H h', with the brace-frame J, brace-guide M, and centring-chuck E, substantially as herein shown and described, for the purpose of adjusting the position of the brace-guide M to the length of the spokes.

3. An improved spoke-tenoning machine, constructed, arranged, and operating as herein shown and described, and for the purpose set forth.

JAS. P. CRUTCHFIELD.
C. T. WHITTEN.

Witnesses:
  JNO. E. LEWIS,
  W. Y. QUARLS.